US012779942B2

(12) United States Patent
Huang et al.

(10) Patent No.: US 12,779,942 B2
(45) Date of Patent: Nov. 3, 2026

(54) METHOD AND DEVICE FOR CONTROLLING AIR CONDITIONING OUTLET OF VEHICLE, AND VEHICLE

(71) Applicant: HONDA MOTOR CO., LTD., Tokyo (JP)

(72) Inventors: Qin Huang, Beijing (CN); Takeshi Matsushita, Tokyo (JP); Shimpei Higami, Beijing (CN); Masaki Sekiguchi, Beijing (CN); Takashi Horiuchi, Beijing (CN); Fang Shi, Beijing (CN); Maofang Li, Beijing (CN); Yangyang Xu, Beijing (CN)

(73) Assignee: HONDA MOTOR CO., LTD., Tokyo (JP)

( * ) Notice: Subject to any disclaimer, the term of this patent is extended or adjusted under 35 U.S.C. 154(b) by 139 days.

(21) Appl. No.: 18/776,742

(22) Filed: Jul. 18, 2024

(65) Prior Publication Data

US 2025/0026175 A1 Jan. 23, 2025

(30) Foreign Application Priority Data

Jul. 20, 2023 (CN) ........................ 202310898577.8

(51) Int. Cl.
*B60H 1/00* (2006.01)

(52) U.S. Cl.
CPC ..... *B60H 1/00807* (2013.01); *B60H 1/00878* (2013.01); *B60H 2001/00092* (2013.01)

(58) Field of Classification Search
CPC ........... B60H 1/00807; B60H 1/00878; B60H 2001/00092; B60H 1/00735; B60H 1/00742; B60H 1/00871; B60H 1/34; B60H 2001/3485
See application file for complete search history.

(56) References Cited

U.S. PATENT DOCUMENTS

| | | | | |
|---|---|---|---|---|
| 2017/0267065 A1* | 9/2017 | Kim | ........................ | B60H 1/242 |
| 2018/0072131 A1* | 3/2018 | Lee | ........................... | B60S 1/54 |

FOREIGN PATENT DOCUMENTS

| | | | | | |
|---|---|---|---|---|---|
| JP | 2002362129 | A | * | 12/2002 | ........... B60H 1/0075 |
| JP | 2004090853 | A | * | 3/2004 | |
| JP | 2004268797 | A | * | 9/2004 | |
| JP | 3633046 | B2 | * | 3/2005 | |
| JP | 3861725 | B2 | * | 12/2006 | |
| KR | 20090020883 | A | * | 2/2009 | ......... B60H 1/00964 |
| KR | 20190025224 | A | * | 3/2019 | ......... B60H 1/00764 |
| WO | WO-2021190884 | A1 | * | 9/2021 | ......... B60H 1/00735 |

* cited by examiner

*Primary Examiner* — Kun Kai Ma
(74) *Attorney, Agent, or Firm* — Amin, Turocy & Watson, LLP

(57) ABSTRACT

The present invention relates to a method for controlling an air conditioning outlet of a vehicle, including: collecting an ambient temperature and a user set temperature; determining a target value according to the ambient temperature and the user set temperature; determining a target working mode from a plurality of preset working modes of an air conditioning outlet according to the target value, the working mode including a preset air outlet direction; and enabling the air conditioning outlet to work in the target working mode.

19 Claims, 3 Drawing Sheets

METHOD AND DEVICE FOR CONTROLLING AIR CONDITIONING OUTLET OF VEHICLE, AND VEHICLE

CROSS-REFERENCE TO RELATED APPLICATION

Priority is claimed on Chinese Patent Application No. 202310898577.8, filed on Jul. 20, 2023, the contents of which are incorporated herein by reference.

BACKGROUND OF THE INVENTION

Field of the Invention

The present invention relates to the technical field of air conditioning of a vehicle, in particular to a method and device for controlling an air conditioning outlet of a vehicle, a vehicle, a computing device, and a computer-readable storage medium.

Description of Related Art

There are usually a plurality of air conditioning outlets on an existing vehicle, and if all air outlet directions thereof are manually controlled by passengers, the operation is cumbersome.

Based on this, methods for automatically controlling an air conditioning outlet are proposed, and one method thereof is as follows: analyzing, according to temperatures inside and outside a vehicle, a temperature of an air outlet, and a voltage of an air blower, to acquire a target opening angle of each air conditioning outlet in the vehicle, and controlling an opening angle of each air conditioning outlet to be the corresponding target opening angle, thereby allowing passengers to feel temperature rise or temperature falling in a short time, and the user experience is improved. However, the method has the following technical problem: a direction of the air conditioning outlet is adjusted only according to the temperatures inside and outside the vehicle and an air volume of the air blower, and a difference between people is not taken into consideration, that is, actual requirements of different passengers are not taken into consideration, so that the user experience is poor.

Another method is as follows: acquiring, when an in-vehicle air conditioner operates, environmental characteristic parameters inside a vehicle and temperature characteristic parameters of a passenger; determining whether the body feeling of the passenger satisfies the thermal comfort according to the environmental characteristic parameters inside the vehicle and the temperature characteristic parameters of the passenger; acquiring a face position of the passenger; and controlling an air direction of the in-vehicle air conditioning outlet according to a determination result and the face position of the passenger. In this manner, the air direction of the air conditioning outlet can be automatically determined according to the face position of the passenger, so that the thermal comfort of the passenger is ensured, thereby achieving an efficient air direction adjustment. However, the method has the following technical problem: the body feeling of the passenger is determined according to a temperature and a humidity inside the vehicle and a temperature of the face and clothes of the passenger, and a machine learning model is established through learning of a robot so as to acquire the determination result of whether the body feeling is comfortable. The method also does not take into consideration of the difference between people, that is, does not take into consideration of the actual requirements of different passengers, so that the user experience is poor.

SUMMARY OF THE INVENTION

In automatic control of an air conditioning outlet on an existing vehicle, temperatures inside and outside the vehicle, an air volume of the air blower, or a temperature of the face and the clothes of a passenger are taken into consideration, a difference between people is not taken into consideration, that is, actual requirements of different passengers are not taken into consideration, so that the user experience is poor.

An object of the present invention is to solve the above technical problems.

In a first aspect, the present invention provides a method for controlling an air conditioning outlet of a vehicle, including:

- collecting an ambient temperature and a user set temperature;
- determining a target value according to the ambient temperature and the user set temperature;
- determining a target working mode from a plurality of preset working modes of an air conditioning outlet according to the target value, the working mode including a preset air outlet direction; and
- enabling the air conditioning outlet to work in the target working mode.

According to the present invention, controlling the air conditioning outlet of the vehicle not only considers environmental factors but also considers requirements of a user, and a more matched working mode can be automatically provided based on the requirements of the user, so that the matching degree is higher, it does not require the user to manually adjust the air outlet direction, and a temperature inside the vehicle can always meet the requirements of the user.

In an embodiment, the working mode includes a first working mode and a second working mode, the first working mode including a preset first air outlet direction in which the air conditioning outlet faces the user, and the second working mode including a preset second air outlet direction in which the air conditioning outlet does not face the user.

In an embodiment, the working mode further includes a third working mode, the third working mode including a preset third air outlet direction in which the air conditioning outlet intermittently faces the user.

In the present invention, according to a change of the target value, different working modes can be achieved, so that the operation frequency of the user on air direction adjustment is reduced, and the expectation of most users can be met.

In an embodiment, the first working mode is a centralized blowing mode, the second working mode is an indirect blowing mode, and the third working mode is a left-right sweeping mode.

Each working mode of the present invention is provided with a corresponding air blowing mode, so that different requirements of users can be met.

In an embodiment, the target value includes a first value range and a second value range, and in a cooling state, when the target value is within the first value range, the air conditioning outlet is controlled to be in the first working mode, when the target value is within the second value range, the air conditioning outlet is controlled to be in the second working mode, and the second value range is higher than the first value range.

In the present invention, when the target value changes within a certain value range, the working mode of the air conditioning outlet does not change, so that the user can feel temperature falling in a short time, thereby improving the user experience.

In an embodiment, when the ambient temperature increases, the target value changes from the second value range toward the first value range; alternatively, when the user set temperature increases, the target value changes from the first value range toward the second value range.

In the present invention, the target value changes with different ambient temperatures and user set temperatures, and the target value decreases as the ambient temperature increases, and increases as the user set temperature increases.

In an embodiment, the target value includes a first value range, a second value range, and a third value range, and in a cooling state, when the target value is within the first value range, the air conditioning outlet is controlled to be in the first working mode, when the target value is within the second value range, the air conditioning outlet is controlled to be in the third working mode, and when the target value is within the third value range, the air conditioning outlet is controlled to be in the second working mode, the third value range is higher than the second value range, and the second value range is higher than the first value range.

In the present invention, when the target value changes within a certain value range, the working mode of the air conditioning outlet does not change, so that the user can feel temperature falling in a short time, thereby improving the user experience.

In an embodiment, when the ambient temperature increases, the target value changes from the second value range toward the first value range, or the target value changes from the third value range toward the second value range, or the target value changes from the third value range toward the first value range;

alternatively, when the user set temperature increases, the target value changes from the first value range toward the second value range, or the target value changes from the second value range toward the third value range, or the target value changes from the first value range toward the third value range.

In the present invention, the target value changes with different ambient temperatures and user set temperatures, and the target value decreases as the ambient temperature increases, and increases as the user set temperature increases.

In an embodiment, the target value includes a fourth value range and a fifth value range, and in a heating state, when the target value is within the fourth value range, the air conditioning outlet is controlled to be in the second working mode, when the target value is within the fifth value range, the air conditioning outlet is controlled to be in the first working mode, and the fifth value range is higher than the fourth value range.

In the present invention, when the target value changes within a certain value range, the working mode of the air conditioning outlet does not change, so that the user can feel temperature falling in a short time, thereby improving the user experience.

In an embodiment, when the ambient temperature increases, the target value changes from the fifth value range toward the fourth value range;

alternatively, when the user set temperature increases, the target value changes from the fourth value range toward the fifth value range.

In the present invention, the target value changes with different ambient temperatures and user set temperatures, and the target value decreases as the ambient temperature increases, and increases as the user set temperature increases.

In an embodiment, the target value includes a fourth value range and a fifth value range, and in a heating state, when the target value is within the fourth value range, the air conditioning outlet is controlled to be in the second working mode, and when the target value is within the fifth value range, a temperature of a heat radiator of the vehicle is collected, and when the temperature of the heat radiator is equal to or higher than a first threshold, the air conditioning outlet is controlled to be in the first working mode, when the temperature of the heat radiator is lower than the first threshold, the air conditioning outlet is controlled to be in the second working mode, and the fifth value range is higher than the fourth value range.

In the present invention, when the air conditioner starts to heat, the air conditioning outlet blows out cold air instead of hot air, and only when the temperature of the heat radiator reaches a certain value, the air conditioning outlet blows out hot air, so that the air conditioning outlet is controlled to be in the indirect blowing mode before the temperature of the heat radiator reaches the first threshold value; and after the temperature of the heat radiator rises to the first threshold, the air blown out from the air conditioning outlet is warm air, and thus the air conditioning outlet is controlled to be in the centralized blowing mode. In this manner, the cold air at the start can be prevented from blowing to the user, thereby improving the user experience.

In an embodiment, when the ambient temperature increases, the target value changes from the fifth value range toward the fourth value range;

alternatively, when the user set temperature increases, the target value changes from the fourth value range toward the fifth value range.

In the present invention, the target value changes with different ambient temperatures and user set temperatures, and the target value decreases as the ambient temperature increases, and increases as the user set temperature increases.

In an embodiment, the ambient temperature includes a temperature inside the vehicle and a temperature outside the vehicle.

In the present invention, the target value is determined according to the temperature inside the vehicle and the temperature outside the vehicle, and the working mode of the air conditioning outlet is determined according to the target value, so that the temperature inside the vehicle can always meet the requirement of user comfort.

In an embodiment, the method further includes:

collecting a specific coordinate point set by a user, and controlling the air conditioning outlet to blow air toward the specific coordinate point, in which the specific coordinate point is selected from a plurality of equally divided coordinate points set in a transverse space and a vertical space on a rear side of the vehicle that the air conditioning outlet faces.

In the present invention, an orientation of the air conditioning outlet can be adjusted by the user, thereby meeting requirements of users with different physiques on the air outlet orientation of the air conditioner, obtaining an optimal air outlet direction according to the requirements of the user, and improving the user experience.

In an embodiment, the specific coordinate point includes a first coordinate point, a second coordinate point, a third coordinate point, and a fourth coordinate point, and controlling the air conditioning outlet to blow air toward the specific coordinate point includes:

controlling that the air conditioning outlet sweeps air back and forth between the first coordinate point and the second coordinate point when the working mode of the air conditioning outlet is the third working mode;

controlling the air conditioning outlet to blow air toward the third coordinate point when the working mode of the air conditioning outlet is the first working mode; and controlling the air conditioning outlet to blow air toward the fourth coordinate point when the working mode of the air conditioning outlet is the second working mode, the plurality of equally divided coordinate points set in the transverse space and the vertical space include a coordinate point of a first range, a coordinate point of a second range, and a coordinate point of a third range, the third range being higher than the second range, the second range being higher than the first range, the third coordinate point being selected within the coordinate point of the second range, and the fourth coordinate point being selected within the coordinate point of the first range or the coordinate point of the third range.

In an embodiment, the method further includes:

recording a specific coordinate point set by the user and the working mode of the air conditioning outlet; and controlling, when the user is detected, the air conditioning outlet to blow air toward the specific coordinate point in the working mode according to the recorded specific coordinate point and working mode.

In the present invention, the user can adjust the air conditioning outlet to face a specific coordinate point in a fixed working mode of the air conditioning outlet, and the working mode and the specific coordinate point can both be recorded, when the same user logs in a next ride, after the user selects a working mode, the air conditioning outlet can be controlled to blow air toward the user at the specific coordinate point in each working mode set last time.

In a second aspect, the present invention provides a device for controlling an air conditioning outlet of a vehicle, including:

a temperature acquisition module configured to collect an ambient temperature and a user set temperature;

a target value determining module configured to determine a target value according to the ambient temperature and the user set temperature;

an air conditioning outlet working mode determining module configured to determine a target working mode from a plurality of preset working modes of the air conditioning outlet according to the target value, the working mode including a preset air outlet direction; and a working module configured to enable the air conditioning outlet to work in the target working mode.

In a third aspect, the present invention provides a vehicle, in which an air outlet direction of an air conditioning outlet is controlled using the method for controlling an air conditioning outlet of a vehicle according to any one of the above-described first aspects.

In an embodiment, a plurality of control modes are provided for the air conditioning outlet of the vehicle, the method for controlling an air conditioning outlet of a vehicle is executed in a specific control mode, and the specific control mode is turned on or off by an operation of a user.

In a fourth aspect, the present invention provides a computing device, including:

a communication interface;

at least one processor connected to the communication interface; and at least one memory connected to the processor and storing a program instruction, when being executed by the at least one processor, the program instruction causing the at least one processor to execute the method for controlling an air conditioning outlet of a vehicle according to any one of the above-described first aspects.

In a fifth aspect, the present invention provides a computer-readable storage medium storing a program instruction, when being executed by a computer, the program instruction causing the computer to execute the method for controlling an air conditioning outlet of a vehicle according to any one of the above-described first aspects.

These and other aspects of the present invention will be more apparent in the following description of embodiment (s).

Figure 1:
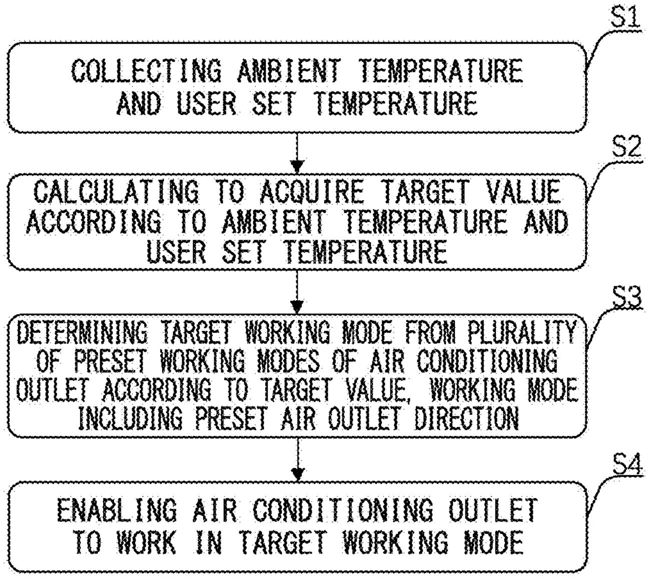
FIG. 1 is a flow diagram of a method for controlling an air conditioning outlet of a vehicle according to an embodiment.

It should be understood that in the above-described schematic structural diagrams, sizes and forms of respective block diagrams are merely for reference, and should not constitute exclusive interpretation of the embodiments of the present invention. Relative positions and inclusion relations between the respective block diagrams presented in the schematic structural diagrams are merely used to schematically represent structural associations therebetween, and do not limit a physical connection manner in the embodiments of the present invention.

DETAILED DESCRIPTION OF THE INVENTION

Technical solutions provided by the present invention are further described below with reference to the drawings and embodiments. It should be understood that a system structure and a business scenario provided in the embodiments of the present invention are mainly used to describe possible embodiments of the technical solutions of the present invention, and should not be construed as only limiting the technical solutions of the present invention. Those having ordinary skills in the art can understand that, with gradual progress of the system structure and appearance of new business scenarios, the technical solutions provided by the present invention are also applicable to similar technical problems.

It should be understood that the embodiments of the present invention provide various embodiments of a method and a device for controlling an air conditioning outlet of a vehicle, and a vehicle. Since principles of these technical solutions solving the problem are the same or similar to each other, in the following descriptions of specific embodiments, certain repetitions may not be described again, but it should be considered that these specific embodiments have been mutually referenced and may be mutually combined.

Unless otherwise defined, all technical and scientific terms used herein have the same meaning as commonly understood by those having ordinary skills in the art pertaining to the present invention. When there is a contradiction, the meaning should subject to the meaning described in the description or the meaning obtained according to the content recited in the description. In addition, the terms used herein are only for the purpose of describing the embodiments of the present invention, and are not intended to limit the present invention. In order to accurately describe the technical contents of the present invention and to accurately understand the present invention, the terms used in the description are given the following explanation or definition before the specific embodiments are described.

Herein, the present invention will be described in detail with reference to the drawings.

The embodiments of the present invention provide a method for controlling an air conditioning outlet of a vehicle, and in some embodiments, the method for controlling an air conditioning outlet of a vehicle includes:

S1: collecting an ambient temperature and a user set temperature.

S2: determining a target value according to the ambient temperature and the user set temperature.

S3: determining a target working mode from a plurality of preset working modes of an air conditioning outlet according to the target value, the working mode including a preset air outlet direction.

S4: enabling the air conditioning outlet to work in the target working mode.

According to the present invention, controlling the air conditioning outlet of the vehicle not only considers environmental factors but also considers requirements of a user (the user can set a temperature meeting his/her own requirements), and a more matched working mode can be automatically provided based on the requirements of the user, so that the matching degree is higher, it does not require the user to manually adjust the air outlet direction, and an temperature inside the vehicle can always meet the requirements of the user.

In the embodiment of the present invention, the air conditioning outlet may include an opening provided in an instrument panel or an interior trim panel, a shutter arranged in the opening, and a motor driving the shutter to rotate to adjust the air outlet direction. In addition, an execution main body of the control method may be a control unit (for example, an electronic control unit (ECU)) of an air conditioner, and a control mode of the air conditioning outlet may include the following several types: an operation mode, a forced centralization mode, a forced indirect mode, an automatic mode (Auto mode), and a switching mode.

The operation mode refers to that the user can slide up, down, left, right within a specified area on a control mode operation interface of the air conditioning outlet to adjust an air direction. In this mode, the air conditioning outlet can be freely adjusted.

The forced centralization mode refers to a mode in which the air conditioning outlet is forced to execute centralized blowing in a fixed manner, and the user may click an icon ICON of the forced centralization mode on the control mode operation interface of an electric air outlet, thereby adjusting the air outlet direction of the air conditioning outlet to blow air in a centralized manner (blowing air toward the face of the user all the time, or blowing air toward the hand and the body of the user all the time, for example, air may be blown toward the hand of the user sitting on the driver seat, and air may be blown toward the body of the user sitting on the passenger seat). In this mode, a plurality of air conditioning outlets can be simultaneously controlled to execute centralized blowing without an operation on each air conditioning outlet, thereby shortening the operation time.

The forced indirect mode refers to a mode in which the air conditioning outlet is forced to execute indirect blowing in a fixed manner, and the user can click the icon ICON of the forced indirect mode on the control mode operation interface of the air conditioning outlet, thereby adjusting the air outlet direction of the air conditioning outlet to be indirect blowing, so that air is blown avoiding the face of the user, and may be blown upward and toward the top of the head of the user. Also, air may be blown downward and toward the foot of the user. In this mode, a plurality of air conditioning outlets can be simultaneously controlled to execute indirect blowing without an operation on each air conditioning outlet, thereby shortening the operation time.

The automatic mode refers to a working mode in which the control unit automatically adjusts the air conditioning outlet based on collected information. The automatic mode is started by clicking an automatic mode icon ICON on the control mode operation interface of the air conditioning outlet.

The switching mode refers to a mode in which an icon ICON of a switch is clicked on the control mode operation interface of the air conditioning outlet, thereby achieving opening and closing of the air conditioning outlet.

The forced centralization mode, the forced indirect mode, the automatic mode, and the switching mode may also be manipulated by voice or gesture recognition.

In the embodiment of the present invention, the present invention implements control of the air conditioning outlet of the vehicle in an automatic mode, and FIG. 1 is a flow diagram of the method for controlling an air conditioning outlet of a vehicle.

In step S1, an ambient temperature and a user set temperature are collected. The ambient temperature refers to a temperature outside the vehicle and a temperature inside the vehicle, and the temperature outside the vehicle and the temperature inside the vehicle may be acquired by a temperature sensor in the vehicle and then transmitted to the ECU of the air conditioner. The temperatures can also be acquired by other temperature measuring devices and then transmitted to the ECU of the air conditioner.

The temperature outside the vehicle is acquired by an outside temperature sensor, the outside temperature sensor is generally made of a thermistor, and a resistance thereof changes when the temperature outside the vehicle changes. When the temperature is low, the resistance is large, and when the temperature is high, the resistance is small.

The temperature inside the vehicle is acquired by an in-vehicle sensor, and the in-vehicle sensor similarly adopts a thermistor material, and has a negative temperature coefficient. The sensor is generally installed below an instrument board and connected to an air conditioning duct through an air tube, and when an airflow passes rapidly, the generated vacuum guides air through the in-vehicle sensor.

The user set temperature is set by the user according to his/her own requirements. The larger a difference between the user set temperature and the ambient temperature, the larger an air conditioning load.

In step S2, a target value is determined according to the ambient temperature and the user set temperature. The target value refers to a temperature air output (TAO) value, and the TAO value refers to an effective air-out temperature, and is an air temperature of an air blower necessary to maintain the temperature inside the vehicle at a set temperature. The TAO value is a default value of the air conditioner and is a control index of a temperature in a carriage. Generally, according to the TAO value, an air blowing temperature, an air-in mode (inner circulation and outer circulation), and an air supply mode (blowing air to face, blowing air to foot, and the like) of the air conditioner can be controlled. In the present invention, the TAO value is calculated according to the temperatures inside and outside the vehicle, and the user set temperature. The TAO value may be calculated according to parameters such as the user set temperature, the temperature inside the vehicle, and the temperature outside the vehicle, or may be calculated by adding insolation to these parameters. Hereinafter, an example of a calculation method of the TAO value is given.

$$TAO = KSET*TSET - KR*TR - KAM*TAM - KS*TS + C \quad \text{Formula 1}$$

Here, KSET, KR, KAM, and KS are coefficients, and C is a constant, these parameters may be appropriately set by those having ordinary skills in the art in consideration of actual situations and the like. In addition, TSET is a set temperature, TR is a temperature inside the vehicle, TAM is a temperature outside the vehicle, and TS is insolation.

In step S3, a target working mode is determined from a plurality of preset working modes of an air conditioning outlet according to the target value, the working mode including a preset air outlet direction. In the embodiment of the present invention, the target working mode can be determined from the plurality of preset working modes of the air conditioning outlet according to the TAO value.

In step S4, the air conditioning outlet is enabled to work in the target working mode. After the TAO value is determined, the target working mode of the air conditioning outlet may be determined based on the TAO value.

In some embodiments, the working mode includes a first working mode and a second working mode, the first working mode including a preset first air outlet direction in which the air conditioning outlet faces the user, and the second working mode including a preset second air outlet direction in which the air conditioning outlet does not face the user.

In some embodiments, the working mode further includes a third working mode, the third working mode including a preset third air outlet direction in which the air conditioning outlet intermittently faces the user.

In the present invention, according to a change of the target value, different working modes can be achieved, so that the operation frequency of the user on air direction adjustment is reduced, and the expectation of most users can be met.

In some embodiments, the first working mode is a centralized blowing mode, the second working mode is an indirect blowing mode, and the third working mode is a left-right sweeping mode.

In the embodiments of the present invention, the first working mode may be a centralized blowing mode, and the centralized blowing mode is that the air conditioning outlet faces the user and may blow air toward the face of the user. The second working mode may be an indirect blowing mode, and the indirect blowing mode is that the air conditioning outlet avoids the user, in which air may be blown avoiding the face of the user, and may be blown upward and toward the top of the head of the user. Also, air may be blown downward and toward the foot of the user. The third working mode may be a left-right sweeping mode, and the left-right sweeping mode is that the air conditioning outlet intermittently faces the user, in which the air outlet direction continuously changes, that is, the air conditioning outlet faces the user and the left-right sweeping mode is adopted to blow air, specifically, the air outlet direction of the air conditioning outlet is blowing air from left to right (left and right in a vehicle-width direction), and then blowing air from right to left, thereby achieving left-right sweeping in a reciprocating manner.

In some embodiments of the present invention, the first working mode may include a preset first air outlet direction and a preset third air outlet direction, and the first air outlet direction is that the air conditioning outlet faces the user, that is, centralized blowing, in which air may be blown centralizedly toward the face of the user, or may be blown centralizedly toward the body of the user, or may be blown centralizedly toward the hand of the user. The third air outlet direction is that the air conditioning outlet intermittently faces the user, that is, left-right sweeping, in which air may be intermittently blown toward the face of the user. The first working mode may be controlled to be the following air blowing modes, for example: first execute the centralized blowing, and then the left-right sweeping; alternatively, execute the centralized blowing and the left-right sweeping in cycles, that is, execute the centralized blowing for a preset time (for example, 30 seconds)→execute the left-right sweeping for 30 seconds→execute the centralized blowing for 30 seconds→execute the left-right sweeping for 30 seconds . . . until entering the second working mode. Similarly, the second working mode may include a preset second air outlet direction and a preset third air outlet direction, and the second air outlet direction is that the air conditioning outlet avoids the user, that is, indirect blowing, in which air may be blown toward the top of the head of the user, or may be blown toward the foot of the user. The third air outlet direction is that the air conditioning outlet intermittently faces the user, that is, left-right sweeping, in which air may be intermittently blown toward the face of the user. The second working mode may be controlled to be the following air blowing modes, for example: first execute the left-right sweeping, and then the indirect blowing; alternatively, execute the left-right sweeping and the indirect blowing in cycles. Similarly, the third working mode may also include a preset first air outlet direction and a preset third air outlet direction, and the first air outlet direction is that the air conditioning outlet faces the user, that is, centralized blowing, in which air may be blown centralizedly toward the face of the user. The third air outlet direction is that the air conditioning outlet intermittently faces the user, that is, left-right sweeping, in which air may be intermittently blown toward the face of the user. The third working mode may be controlled to be the following air blowing modes, for example: first execute the left-right sweeping, and then the centralized blowing; alternatively, execute the left-right sweeping and the centralized blowing in cycles, that is, execute the left-right sweeping for a preset time (for example, 30 seconds)→execute the centralized blowing for 30 seconds→execute the left-right sweeping for 30 seconds→execute the centralized blowing for 30 seconds . . . until entering the second working mode.

The first working mode, the second working mode, and the third working mode may also include three or more preset air outlet directions.

Each working mode of the present invention is provided with a corresponding air blowing mode, so that different requirements of users can be met.

In some embodiments, the target value range includes a first value range and a second value range, and in the cooling state, when the target value is within the first value range, the air conditioning outlet is controlled to be in the first working mode, when the target value is within the second value range, the air conditioning outlet is controlled to be in the second working mode, and the second value range is higher than the first value range.

In the present invention, although the target value changes all the time, when the target value changes within a certain value range, the working mode of the air conditioning outlet does not change (that is, the working mode is fixed within a range of value), so that the user can feel temperature falling in a short time, thereby improving the user experience.

Figure 2:
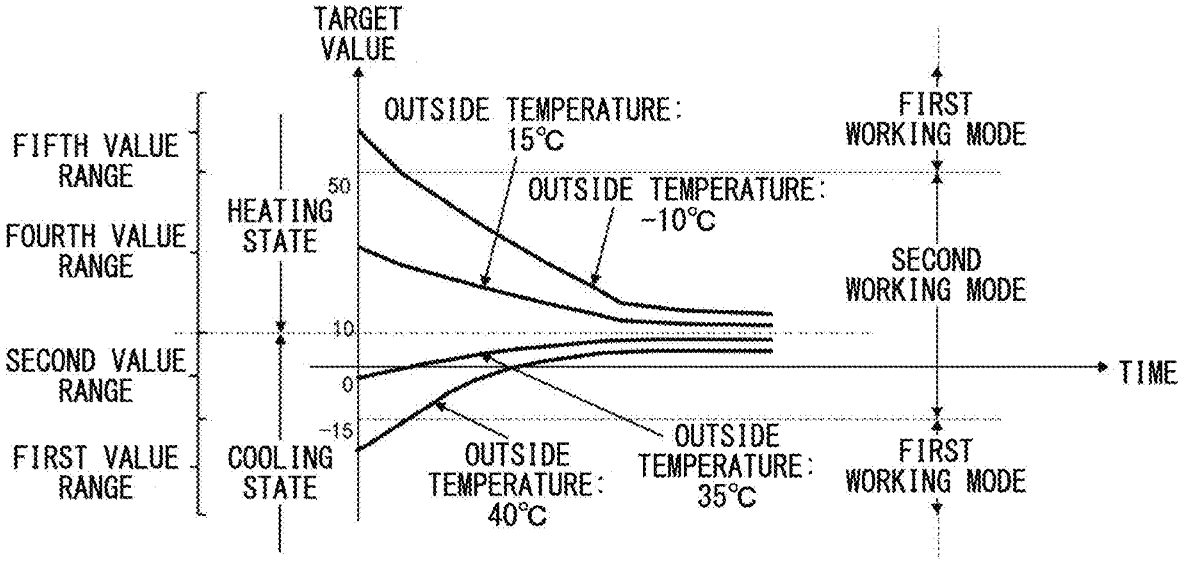
FIG. 2 is a schematic diagram of a relation between a target value and a working mode of an air conditioning outlet according to a first embodiment of the present invention.

In the embodiments of the present invention, as shown in FIG. 2, the target value includes the first value range and the second value range, and in the cooling state, the first value range is −15 or less, and the second value range is −15 to 10. These specific value ranges may be set based on vehicle parameters, and are subject to real vehicle adjustment results.

As shown in FIG. 2, in the cooling state, when the target value (TAO value) is within the first value range, the air conditioning outlet is controlled to be in the first working mode which may be the centralized blowing mode, in which air is blown to the user all the time such that the comfort of the user can be improved. When the target value (TAO value) is within the second value range, the air conditioning outlet is controlled to be in the second working mode which may be the indirect blowing mode.

In some embodiments, when the ambient temperature increases, the target value changes from the second value range toward the first value range; alternatively, when the user set temperature increases, the target value changes from the first value range toward the second value range.

In the present invention, the target value changes with different ambient temperatures and user set temperatures, and the target value decreases as the ambient temperature increases, and increases as the user set temperature increases.

In the embodiments of the present invention, the target value (TAO value) decreases as the ambient temperature increases, and increases as the user set temperature increases. When the TAO value changes, the corresponding working mode may also change.

As shown in FIG. 2, the target value includes the first value range and the second value range, and in the cooling state, the first value range is −15 or less, and the second value range is −15 to 10. In a case where the temperature outside the vehicle is 40° C. and the temperature inside the vehicle is also 40° C., when the user set temperature is 20° C., the target value is −25 in this case, which belongs to the first value range, so that the air conditioning outlet is controlled to be in the first working mode which may be the centralized blowing mode, and the temperature inside the vehicle gradually decreases from 40° C. to the user set temperature with a change in time as cold air is continuously blown out. During this process, the target value increases with time, so that the target value changes from the first value range toward the second value range, and finally, when the temperature inside the vehicle is equal to the user set temperature, the target value tends to be stable and the air conditioning outlet remains in the second working mode which may be the indirect blowing mode. In a case where the temperature outside the vehicle is 35° C. and the temperature inside the vehicle is also 35° C., when the user set temperature is 23° C., the target value is −5 in this case, which belongs to the second value range, so that the air conditioning outlet is controlled to be in the second working mode which may be the indirect blowing mode, and the temperature inside the vehicle gradually decreases from 35° C. to the user set temperature with a change in time as cold air is continuously blown out. During this process, the target value increases with time, but since the target value is within the second value range all the time, the air conditioning outlet remains in the second working mode which may be the indirect blowing mode.

In the present invention, it is considered to change the target value (TAO value) according to the user set temperature, and then adjust the working mode of the air conditioning outlet, and in this manner, the temperature inside the vehicle can always meet the requirement of user comfort without the user manually adjusting the air outlet direction of the air conditioning outlet, and the user can feel temperature falling in a short time, so that the user experience is improved.

In some embodiments, the target value includes a first value range, a second value range, and a third value range, and in the cooling state, when the target value is within the first value range, the air conditioning outlet is controlled to be in the first working mode, when the target value is within the second value range, the air conditioning outlet is controlled to be in the third working mode, when the target value is within the third value range, the air conditioning outlet is controlled to be in the second working mode, the third value range is higher than the second value range, and the second value range is higher than the first value range.

In the present invention, when the target value changes within a certain value range, the working mode of the air conditioning outlet does not change, so that the user can feel temperature falling in a short time, thereby improving the user experience.

Figure 3:
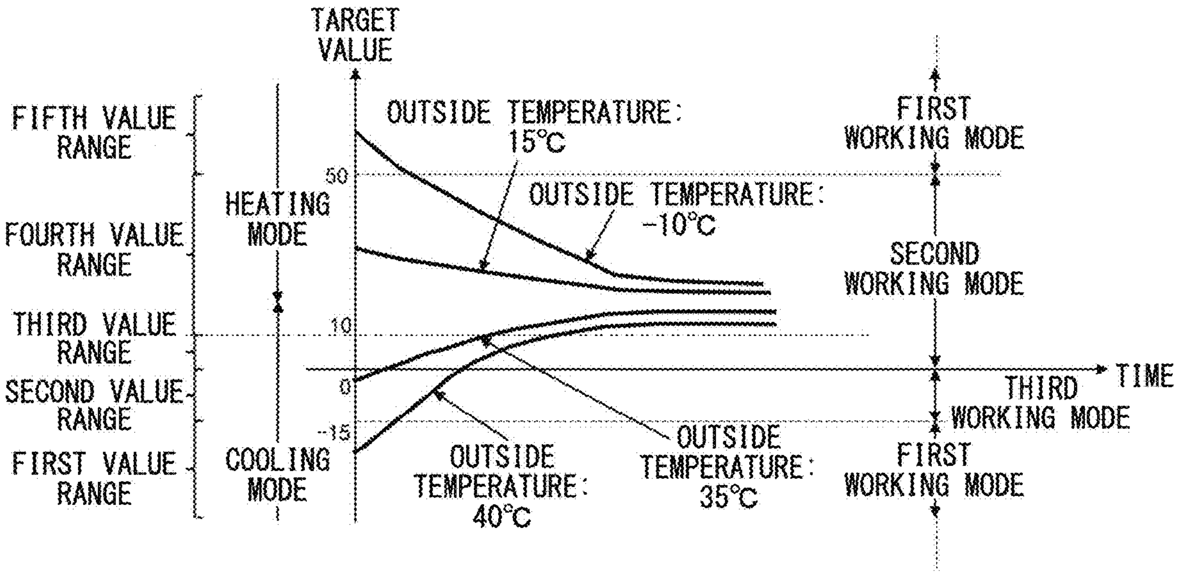
FIG. 3 is a schematic diagram of a relation between a target value and a working mode of an air conditioning outlet according to a second embodiment of the present invention.

In the embodiments of the present invention, as shown in FIG. 3, the target value includes the first value range, the second value range, and the third value range, and in the cooling state, the first value range is −15 or less, the second value range is −15 to 0, and the third value range is 0 to 10. These specific value ranges may be set based on vehicle parameters, and are subject to real vehicle adjustment results.

As shown in FIG. 3, in the cooling state, when the target value is within the first value range, the air conditioning outlet is controlled to be in the first working mode which may be the centralized blowing mode, in which air is blown to the user all the time such that the comfort of the user can be improved. When the target value is within the second value range, the air conditioning outlet is controlled to be in the third working mode which may be the left-right sweeping mode. When the target value is within the third value range, the air conditioning outlet is controlled to be in the second working mode which may be the indirect blowing mode.

In some embodiments, when the ambient temperature increases, the target value changes from the second value range toward the first value range, or the target value changes from the third value range toward the second value range, or the target value changes from the third value range toward the first value range; alternatively, when the user set temperature increases, the target value changes from the first value range toward the second value range, or the target value changes from the second value range toward the third value range, or the target value changes from the first value range toward the third value range.

In the present invention, the target value changes with different ambient temperatures and user set temperatures, and the target value decreases as the ambient temperature increases, and increases as the user set temperature increases.

As shown in FIG. 3, in the cooling state, the first value range is −15 or less, the second value range is −15 to 0, and the third value range is 0 to 10. In a case where the temperature outside the vehicle is 40° C. and the temperature inside the vehicle is also 40° C., when the user set temperature is 20° C., the target value is −25 in this case, which belongs to the first value range, so that the air conditioning outlet is controlled to be in the first working mode which may be the centralized blowing mode, and the temperature inside the vehicle gradually decreases from 40° C. to the user set temperature with a change in time as cold air is continuously blown out. During this process, the target value increases with time, so that the target value changes from the first value range toward the second value range, and from the second value range toward the third value range, so that the air conditioner outlet is controlled to change from the first working mode to the third working mode, and then to the second working mode, that is, the air conditioner outlet can change from the centralized blowing mode to the left-right sweeping mode and then to the indirect blowing mode, and finally, when the temperature inside the vehicle is equal to the user set temperature, the target value tends to be stable and the air conditioning outlet remains in the second working mode which may be the indirect blowing mode. In a case where the temperature outside the vehicle is 35° C. and the temperature inside the vehicle is also 35° C., when the user set temperature is 23° C., the target value is −5 in this case, which belongs to the second value range, so that the air conditioning outlet is controlled to be in the third working mode which may be the left-right sweeping mode, and the temperature inside the vehicle gradually decreases from 35° C. to the user set temperature with a change in time as cold air is continuously blown out. During this process, the target value increases with time, so that the target value changes from the second value range toward the third value range, and finally, when the temperature inside the vehicle is equal to the user set temperature, the target value tends to be stable and the air conditioning outlet remains in the second working mode which may be the indirect blowing mode.

In the present invention, it is considered to change the target value (TAO value) according to the user set temperature, and then adjust the working mode of the air conditioning outlet, and in this manner, the temperature inside the vehicle can always meet the requirement of user comfort without the user manually adjusting the air outlet direction of the air conditioning outlet, and the user can feel temperature falling in a short time, so that the user experience is improved.

In some embodiments, the target value includes a fourth value range and a fifth value range, and in a heating state, when the target value is within the fourth value range, the air conditioning outlet is controlled to be in the second working mode, when the target value is within the fifth value range, the air conditioning outlet is controlled to be in the first working mode, and the fifth value range is higher than the fourth value range.

In the present invention, when the target value changes within a certain value range, the working mode of the air conditioning outlet does not change, so that the user can feel temperature rise in a short time, thereby improving the user experience.

In the embodiments of the present invention, as shown in FIG. 2, the target value range includes the first value range, the second value range, the fourth value range, and the fifth value range, as shown in FIG. 3, the target value includes the first value range, the second value range, the third value range, the fourth value range, and the fifth value range, and in the heating state, the fifth value range is higher than the fourth value range. The fourth value range is 10 to 50, and the fifth value range is 50 or more. These specific value ranges may be set based on vehicle parameters, and are subject to real vehicle adjustment results.

As shown in FIGS. 2 and 3, in the heating state, when the target value is within the fourth value range, the air conditioning outlet is controlled to be in the second working mode which may be the indirect blowing mode. When the target value is within the fifth value range, the air conditioning outlet is controlled to be in the first working mode which may be the centralized blowing mode.

In some embodiments, when the ambient temperature increases, the target value changes from the fifth value range toward the fourth value range; alternatively, when the user set temperature increases, the target value changes from the fourth value range toward the fifth value range.

In the present invention, the target value changes with different ambient temperatures and user set temperatures, and the target value decreases as the ambient temperature increases, and increases as the user set temperature increases.

As shown in FIGS. 2 and 3, in the heating state, the fourth value range is 10 to 50, the fifth value range is 50 or more. In a case where the temperature outside the vehicle is 15° C. and the temperature inside the vehicle is also 15° C., when the user set temperature is 25° C., the target value is 60 in this case, which belongs to the first value range, so that the air conditioning outlet is controlled to be in the first working mode which may be the centralized blowing mode, and the temperature inside the vehicle gradually increases from −15° C. to the user set temperature with a change in time as warm air is continuously blown out. During this process, the target value decreases with time, so that the target value changes from the fifth value range toward the fourth value range, and finally, when the temperature inside the vehicle is equal to the user set temperature, the target value tends to be stable and the air conditioning outlet remains in the second working mode which may be the indirect blowing mode. In a case where the temperature outside the vehicle is −10° C., the temperature inside the vehicle may be −5° C., when the user set temperature is 20° C., the target value is 30 in this case, which belongs to the fourth value range, so that the air conditioning outlet is controlled to be in the second working mode which may be the indirect blowing mode, and the temperature inside the vehicle gradually increases from −10° C. to the user set temperature with a change in time as warm air is continuously blown out. During this process, the target value decreases with time, but since the target value is within the fourth value range all the time, the air conditioning outlet remains in the second working mode which may be the indirect blowing mode.

In the present invention, it is considered to change the target value (TAO value) according to the user set temperature, and then adjust the working mode of the air conditioning outlet, and in this manner, the temperature inside the vehicle can always meet the requirement of user comfort without the user manually adjusting the air outlet direction of the air conditioning outlet, and the user can feel temperature rise in a short time, so that the user experience is improved.

In some embodiments, in the heating state, when the target value is within the fourth value range, the air conditioning outlet is controlled to be in the second working mode, and when the target value is within the fifth value range, a temperature of a heat radiator of the vehicle is collected, and when the temperature of the heat radiator is equal to or higher than a first threshold, the air conditioning outlet is controlled to be in the first working mode, when the temperature of the heat radiator is lower than the first threshold, the air conditioning outlet is controlled to be in the second working mode, and the fifth value range is higher than the fourth value range.

In the embodiments of the present invention, when heating is started, the air conditioning outlet blows out cold air instead of hot air, and only when the temperature of the heat radiator reaches a certain value, the air conditioning outlet blows out hot air, so that the air conditioning outlet is controlled to be in the indirect blowing mode before the temperature of the heat radiator reaches the first threshold value; and after the temperature of the heat radiator rises to the first threshold, the air blown out from the air conditioning outlet is warm air, and thus the air conditioning outlet is controlled to be in the centralized blowing mode.

Figure 4:
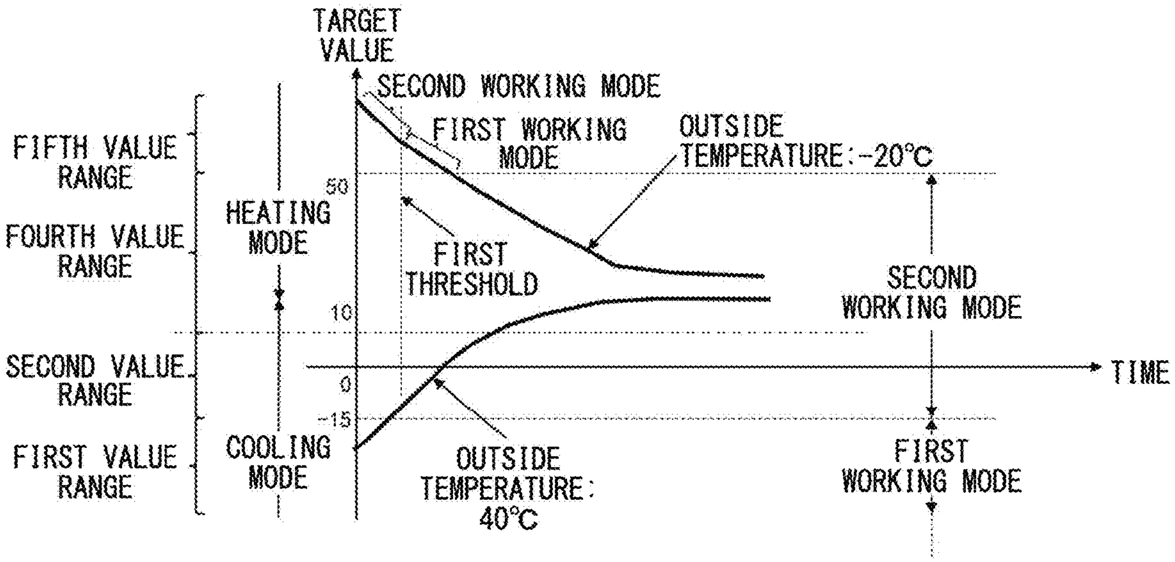
FIG. 4 is a schematic diagram of a relation between a target value and a working mode of an air conditioning outlet according to a third embodiment of the present invention.

Therefore, when the target value is within the fifth value range, the working mode of the air conditioning outlet may also be determined according to the temperature of the heat radiator. The first threshold may be 45° C., and a specific value thereof is determined according to an actual situation. As shown in FIG. 4, when the temperature of the heat radiator is equal to or higher than 45° C., the air conditioning outlet is controlled to be in the first working mode which may be the centralized blowing mode, and when the temperature of the heat radiator is lower than 45° C., the air conditioning outlet is controlled to be in the second working mode which may be the indirect blowing mode.

In some embodiments, when the ambient temperature increases, the target value changes from the fifth value range toward the fourth value range; alternatively, when the user set temperature increases, the target value changes from the fourth value range toward the fifth value range.

In the present invention, the target value changes with different ambient temperatures and user set temperatures, and the target value decreases as the ambient temperature increases, and increases as the user set temperature increases.

As shown in FIG. 4, the target value includes the first value range, the second value range, the fourth value range, and the fifth value range, and in the heating state, the fourth value range is 10 to 50, and the fifth value range is 50 or more. In a case where the temperature outside the vehicle is −20° C., the temperature inside the vehicle may be −15° C., when the user set temperature is 25° C., the target value is 70 in this case, which belongs to the fifth value range. The temperature of the heat radiator of the vehicle is collected at the same time, and when the temperature of the heat radiator is lower than the first threshold, the air conditioning outlet is controlled to be in the second working mode which may be the indirect blowing mode, and the temperature of the heat radiator gradually increases (the target value also gradually decreases with the change of the temperature inside the vehicle) with a change in time; and when the temperature of the heat radiator is equal to or higher than the first threshold, the air conditioning outlet is controlled to be in the first working mode, which may be the centralized blowing mode, and the temperature inside the vehicle gradually increases from −15° C. to the user set temperature as warm air is continuously blown out. During this process, the target value decreases with time, so that the target value changes from the fifth value range toward the fourth value range, and finally, when the temperature inside the vehicle is equal to the user set temperature, the target value tends to be stable and the air conditioning outlet remains in the second working mode which may be the indirect blowing mode. In the heating state, the working mode of the air conditioning outlet is controlled not only based on the change of the target value, but also the change of the temperature of the heat radiator is considered, so that the user can feel the temperature rise in a short time, and cold air can be avoided to blow to the user at the beginning of heating of the air conditioner, thereby improving the user experience.

In some embodiments, the target value may further include a fourth value range, a fifth value range, and a sixth value range, and in the heating state, when the target value is within the fourth value range, the air conditioning outlet is controlled to be in the second working mode, when the target value is within the fifth value range, the air conditioning outlet is controlled to be in the third working mode, when the target value is within the sixth value range, the air conditioning outlet is controlled to be in the first working mode, the sixth value range is higher than the fifth value range, and the fifth value range is higher than the fourth value range.

In the embodiments of the present invention, in the heating state, a plurality of value ranges may also be included, and when the target value is within different value ranges, the air conditioning outlet is controlled to be in different working modes.

In some embodiments, the ambient temperature includes a temperature inside the vehicle and a temperature outside the vehicle. Specifically, the temperature outside the vehicle may be collected by an outside sensor, and the temperature inside the vehicle may be collected by an in-vehicle sensor.

In the present invention, the target value is determined according to the temperature inside the vehicle and the temperature outside the vehicle, and the working mode of the air conditioning outlet is determined according to the target value, so that the temperature inside the vehicle can always meet the requirement of user comfort.

In some embodiments, the method further includes: collecting a specific coordinate point set by a user, and controlling the air conditioning outlet to blow air toward the specific coordinate point, in which the specific coordinate point is selected from a plurality of equally divided coordinate points set in a transverse space and a vertical space on a rear side of the vehicle that the air conditioning outlet faces.

In the present invention, an orientation of the air conditioning outlet can be adjusted by the user, thereby meeting requirements of users with different physiques on the air outlet orientation of the air conditioner, obtaining an optimal air outlet direction according to the requirements of the user, and improving the user experience.

Figure 5A:
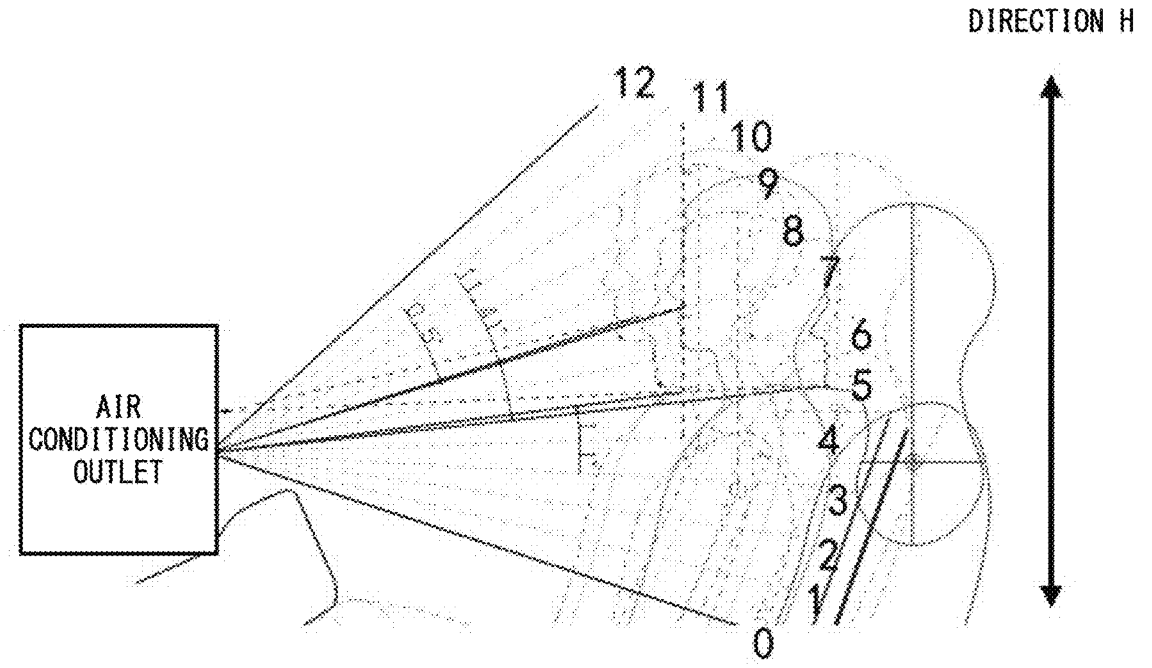
FIG. 5A is a schematic diagram in which coordinate points are set in a vertical space (direction H) on a rear side of the vehicle that an air conditioning outlet faces according to an embodiment of the present invention.
Figure 5B:
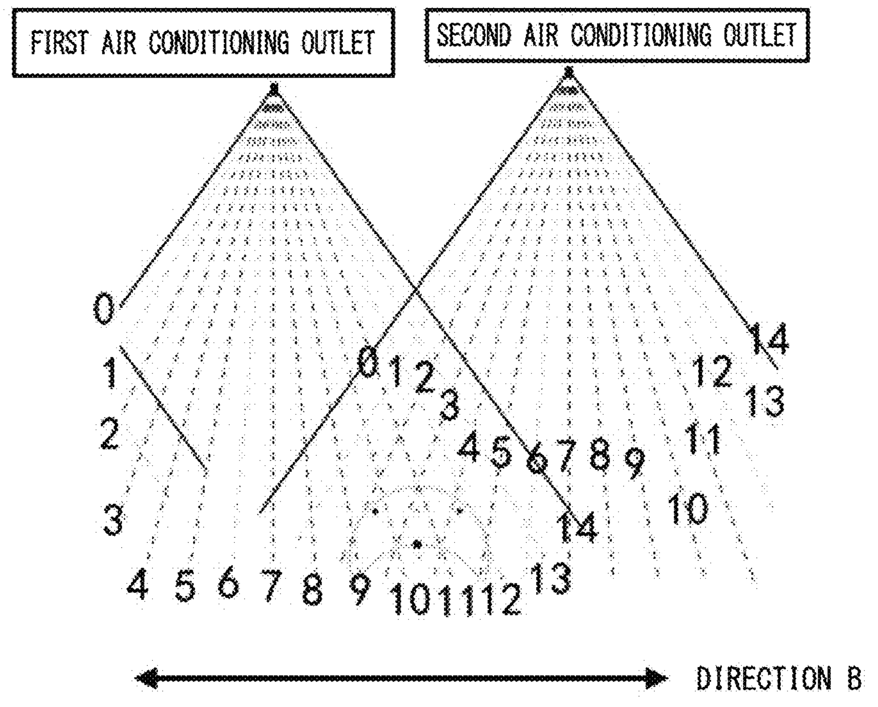
FIG. 5B is a schematic diagram in which coordinate points are set in a transverse space (direction B) on a rear side of the vehicle that air conditioning outlets face according to an embodiment of the present invention.

In the embodiments of the present invention, the air conditioning outlet may be manually set by the user to blow air toward the specific coordinate point. A plurality of equally divided coordinate points may be provided in the transverse space (that is, direction B) and the vertical space (that is, direction H) on a rear side of the vehicle that the air conditioning outlet faces. As shown in FIG. 5A, in the vertical space (that is, direction H) on a rear side of the vehicle that the air conditioning outlet faces, there provided thirteen equally divided coordinate points 0 to 12, which are numbered in decreasing order from top to bottom; and as shown in FIG. 5B, regarding two air conditioning outlets (first air conditioning outlet and second air conditioning outlet, respectively) facing the driver, there provided fifteen equally divided coordinate points 0 to 14 in a transverse space (that is, direction B) on a rear side of the vehicle that the two air conditioning outlets face, respectively, which are numbered in increasing order from left to right. The user can operate a screen in these control modes (forced centralization mode, forced indirect mode, automatic mode) to adjust the coordinate points in the direction H or the direction B, thereby limiting the air conditioning outlet to blow air toward a specific coordinate point.

In some embodiments, the specific coordinate point includes a first coordinate point, a second coordinate point, a third coordinate point, and a fourth coordinate point, and controlling the air conditioning outlet to blow air toward the specific coordinate point includes:

controlling the air conditioning outlet to sweep air back and forth between the first coordinate point and the second coordinate point when the working mode of the air conditioning outlet is the third working mode;

controlling the air conditioning outlet to blow air toward the third coordinate point when the working mode of the air conditioning outlet is the first working mode; and controlling the air conditioning outlet to blow air toward the fourth coordinate point when the working mode of the air conditioning outlet is the second working mode, the plurality of equally divided coordinate points set in the transverse space and the vertical space is divided into coordinate points of a first range, coordinate points of a second range, and coordinate points of a third range, the third range being higher than the second range, the second range being higher than the first range, the third coordinate point being selected from the coordinate points of the second range, and the fourth coordinate point being selected from the coordinate points of the first range or the coordinate points of the third range.

In the embodiments of the present invention, as shown in FIG. 5A, in the vertical space (that is, direction H) on a rear side of the vehicle that the air conditioning outlet faces, there provided 13 equally divided coordinate points 0 to 12, which are numbered in decreasing order from top to bottom, so that the first range may be 0 to 3, the second range may be 4 to 8, and the third range may be 9 to 12. As shown in FIG. 5B, regarding the two air conditioning outlets (first air conditioning outlet and second air conditioning outlet, respectively) facing the driver, there provided fifteen equally divided coordinate points 0 to 14 in a transverse space (that is, direction B) on a rear side of the vehicle that the two air conditioning outlets face, respectively, which are numbered in increasing order from left to right. So that the first range may be 0 to 3, the second range may be 4 to 12, and the third range may be 13 to 14. The first range, the second range, and the third range may be set by the user according to actual needs.

In the embodiments of the present invention, in the automatic mode, the user may operate the screen to freely set different working modes in the cooling state or the heating state, the air conditioning outlets of the driver seat and the passenger seat blow air toward specific coordinate points equally divided in the transverse space (that is, direction B) and the vertical space (that is, direction H). In the embodiments of the present invention, there are two air conditioning outlets facing the driver seat, and there are also two air conditioning outlets facing the passenger seat, which are the first air conditioning outlet and the second air conditioning outlet, respectively, and the working mode of each air conditioning outlet and the specific coordinate point are set as shown in Table 1.

TABLE 1

| | | | Air conditioning outlet of driver seat | | | Air conditioning outlet of passenger seat | | |
|---|---|---|---|---|---|---|---|---|
| | | | | Direction B | | | Direction B | |
| Working mode of air conditioning outlet | | | Direction H | First air conditioning outlet | Second air conditioning outlet | Direction H | First air conditioning outlet | Second air conditioning outlet |
| Automatic mode | Cooling state | Centralized blowing mode | 6 | 10 | 4 | 8 (LASTMODE) | 10 | 4 |
| | | Left-right sweeping mode | 6 | 4→12 | 4→12 | 8 (LASTMODE) | 0→14 | 0→14 |
| | | Indirect blowing mode | 12 | 2 | 12 | 12 (LASTMODE) | 2 | 12 |
| | Heating state | First indirect blowing mode | 12 | 2 | 12 | 12 (same as set value of indirect mode in cooling state) | 2 | 12 |
| | | Centralized blowing mode | 3 | 9 | 5 | 5 (LASTMODE) | 10 | 4 |
| | | Second indirect blowing mode | 0 | 2 | 12 | 0 (LASTMODE) | 2 | 12 |

For example, the specific coordinate points of each mode in the cooling state may all be set by the user. Each coordinate point for the driver seat in the centralized blowing mode, the left-right sweeping mode, and the indirect blowing mode may be set as follows. Centralized blowing mode: in the direction H on a rear side of the vehicle that the air conditioning outlet faces, the air conditioning outlet of the driver seat may be set to face the coordinate point 6; and in the direction B on a rear side of the vehicle that the air conditioning outlet faces, the first air conditioning outlet of the driver seat may be set to face the coordinate point 10, and the second air conditioning outlet of the driver seat may be set to face the coordinate point 4. The coordinate points in this mode are the third coordinate points, and for the direction H: the third coordinate points are set as the coordinate point 6 shown in FIG. 5A, and for the direction B: the third coordinate points are set as the two coordinate points 10 and 4 shown in FIG. 5B.

Left-right sweeping mode: in the direction H on a rear side of the vehicle that the air conditioning outlet faces, the air conditioning outlet of the driver seat may be set to face the coordinate point 6; and in the direction B on a rear side of the vehicle that the air conditioning outlet faces, the first air conditioning outlet of the driver seat can be set to execute the left-right sweeping facing the coordinate points 4 to 12, and the second air conditioning outlet of the driver seat can be set to execute the left-right sweeping facing the coordinate points 4 to 12, specifically, the air conditioning outlet gradually moves to blow air from toward the coordinate point 4 to toward the coordinate point 12, and then gradually moves to blow air from toward the coordinate point 12 to toward the coordinate point 4, thereby achieving the left-right sweeping in a reciprocating manner. The coordinate points in this mode are the first coordinate point and the second coordinate point, and for the direction H: both the first coordinate point and the second coordinate point are set as the coordinate point 6 shown in FIG. 5A, and for direction B: the first coordinate point is set as the coordinate point 4 shown in FIG. 5B, and the second coordinate point is set as the coordinate point 12 shown in FIG. 5B.

Indirect blowing mode: in the direction H on a rear side of the vehicle that the air conditioning outlet faces, the air conditioning outlet of the driver seat may be set to face the coordinate point 12; and in the direction B on a rear side of the vehicle that the air conditioning outlet faces, the first air conditioning outlet of the driver seat may be set to face the coordinate point 2, and the second air conditioning outlet of the driver seat may be set to face the coordinate point 12. The coordinate points in this mode are the fourth coordinate points, and for the direction H: the fourth coordinate points are set as the coordinate point 12 shown in FIG. 5A, and for the direction B: the fourth coordinate points are set as the coordinate points 2 and 12 shown in FIG. 5B.

The specific coordinate points of each mode in the heating state may all be set by the user. Each coordinate point of the centralized blowing mode and the indirect blowing mode (including the first indirect blowing mode and the second indirect blowing mode) is set as follows.

First indirect blowing mode: in the direction H on a rear side of the vehicle that the air conditioning outlet faces, the air conditioning outlet of the driver seat may be set to face the coordinate point 12; and in the direction B on a rear side of the vehicle that the air conditioning outlet faces, the first air conditioning outlet of the driver seat may be set to face the coordinate point 2, and the second air conditioning outlet of the driver seat may be set to face the coordinate point 12. The coordinate points in this mode are the fourth coordinate points, and for the direction H: the fourth coordinate points are both set as the coordinate point 12 shown in FIG. 5A, and for the direction B: the fourth coordinate points are set as the coordinate points 2 and 12 shown in FIG. 5B.

Centralized blowing mode: in the direction H on a rear side of the vehicle that the air conditioning outlet faces, the air conditioning outlet of the driver seat may be set to face the coordinate point 3; and in the direction B on a rear side of the vehicle that the air conditioning outlet faces, the first air conditioning outlet of the driver seat may be set to face the coordinate point 9, and the second air conditioning outlet of the driver seat may be set to face the coordinate point 5. The coordinate points in this mode are the third coordinate points, and for the direction H: the third coordinate points are set as the coordinate point 3 shown in FIG. 5A, and for the direction B: the third coordinate points are set as the two coordinate points 9 and 5 shown in FIG. 5B.

Second indirect blowing mode: in the direction H on a rear side of the vehicle that the air conditioning outlet faces, the air conditioning outlet of the driver seat may be set to face the coordinate point 0; and in the direction B on a rear side of the vehicle that the air conditioning outlet faces, the first air conditioning outlet of the driver seat may be set to face the coordinate point 2, and the second air conditioning outlet of the driver seat may be set to face the coordinate point 12. The coordinate points in this mode are the fourth coordinate points, and for the direction H: the fourth coordinate points are both set as the coordinate point 0 shown in FIG. 5A, and for the direction B: the fourth coordinate points are set as the coordinate points 2 and 12 shown in FIG. 5B.

The specific coordinate points of the passenger seat may be set to be the same as or different from the specific coordinate points of the driver seat.

The specific coordinate points of the first indirect blowing mode in the heating state may be consistent with the indirect blowing mode in the cooling state, and the specific coordinate points of the centralized blowing mode and the second indirect blowing mode may be set by the user (same for the driver seat and the passenger seat).

The specific coordinate point in each working mode of the air conditioning outlet of the passenger seat generally maintains the specific coordinate point set in the previous working mode, but can also be reset by the user, and after the user resets the specific coordinate point, the air conditioning outlet is controlled to blow air according to the specific coordinate point in each working mode set by the user.

In some embodiments, the method further includes:

recording a specific coordinate point set by the user and the working mode of the air conditioning outlet; and controlling, when the user is detected, the air conditioning outlet to blow air toward the specific coordinate point in the working mode according to the recorded specific coordinate point and working mode set by the user.

In the present invention, the user can adjust the air conditioning outlet to face a specific coordinate point in a fixed working mode of the air conditioning outlet, and the working mode and the specific coordinate point can both be recorded, when the same user logs in a next ride, after the user selects a working mode, the air conditioning outlet can be controlled to blow air toward the user at the specific coordinate point in each working mode set last time.

In the embodiments of the present invention, an electronic control unit (ECU) of the air conditioner may record specific coordinate point information of different users, and in a case of the same user and the same working mode, a system may extract a working mode recorded last time by the user, and control the air conditioning outlet to blow air according to the working mode. The working mode includes the specific coordinate point information recorded by the user.

Specifically, the ECU may determine whether it is the same user in the following manner. After a user sits in the vehicle and completes seat position adjustment, a camera starts to identify the user, and logs in to a user account after identification. Alternatively, it may be the user inputting the user account on the control mode operation interface. Further, it may be the user using a mobile terminal to scan a two-dimensional code for login displayed on the control mode operation interface, and then the ECU acquiring the user account and identifying the user identity. Specifically, the mobile terminal may be a mobile phone, a tablet personal computer, or the like.

Extracting a working mode recorded last time by the user, and controlling the air conditioning outlet to blow air according to the working mode is specifically as follows: in a case where the direction of the air conditioning outlet is controlled to be centralized blowing, when the user sets the air conditioning outlet to blow air toward the third coordinate point, the ECU of the air conditioner may record a habit of the user, and centralized modes thereafter will all be executed toward the third coordinate point; in a case where the direction of the air conditioning outlet is controlled to be indirect blowing, when the user sets the air conditioning outlet to blow out air toward the fourth coordinate point, the ECU of the air conditioner may record a habit of the user, and indirect modes thereafter will all be executed toward the fourth coordinate point; and in a case where the direction of the air conditioning outlet is controlled to be left-right sweeping, when the user sets the orientation of the air conditioning outlet to be between the first coordinate point and the second coordinate point, the ECU of the air conditioner may record a habit of the user, and left-right sweeping modes thereafter will all be sweeping air back and forth between the first coordinate point and the second coordinate point.

In some embodiments, the present invention may further include: adjusting, when an opened air outlet channel is VENT (blow air to people) or B/L (blow air to people+blow air to foot), the working mode of the air conditioning outlet according to the TAO value.

In some embodiments, the present invention may further include: adjusting, when the opened air outlet channel is HEAT (blow air to foot), H/D (blow air to foot+blow air to window), or DEF (blow air to window), the air conditioning outlet to the indirect blowing mode, in which air is blown upward, specifically air is blown toward the top of the head of the user.

First Embodiment

A first embodiment of the present invention provides a method for controlling an air conditioning outlet of a vehicle, the method including: acquiring a temperature inside the vehicle, a temperature outside the vehicle, and a user set temperature (S1), calculating a TAO value according to the temperature inside the vehicle, the temperature outside the vehicle, and the user set temperature (S2), determining a target working mode from two working modes (centralized blowing mode and indirect blowing mode) of an air conditioning outlet according to the TAO value (S3), and enabling the air conditioning outlet to work in the target working mode (S4).

A relation between the TAO value and the working mode of the air conditioning outlet is shown in Table 2.

TABLE 2

| | Cooling state | | Heating state | |
|---|---|---|---|---|
| | First value range −20 or less | Second value range −20 to 5 | Fourth value range 5 to 40 | Fifth value range 40 or more |
| Working mode | Centralized blowing mode | Indirect blowing mode | Indirect blowing mode | Centralized blowing mode |
| Air outlet direction | Blow air to face | Blow air upward (blow air toward top of head) | Blow air downward (blow air toward foot) | DR: blow air to hand AS: blow air to body |

As shown in FIG. 2 and Table 2, in the cooling state, when the calculated TAO value is within the first value range, the air conditioning outlet is controlled to be in the centralized blowing mode. When the calculated TAO value is within the second value range, the air conditioning outlet is controlled to be in the indirect blowing mode. When the ambient temperature increases, the TAO value decreases and changes from the second value range toward the first value range, and when the TAO value changes to the first value range, the air conditioning outlet is controlled to change from the indirect blowing mode to the centralized blowing mode. When the user set temperature increases, the TAO value increases and changes from the first value range toward the second value range, and when the TAO value changes to the second value range, the air conditioning outlet is controlled to change from the centralized blowing mode to the indirect blowing mode.

In the heating state, when the calculated TAO value is within the fourth value range, the air conditioning outlet is controlled to be in the indirect blowing mode. When the calculated TAO value is within the fifth value range, the air conditioning outlet is controlled to be in the centralized blowing mode. When the ambient temperature increases, the TAO value decreases and changes from the fifth value range toward the fourth value range, and when the TAO value changes to the fourth value range, the air conditioning outlet is controlled to change from the centralized blowing mode to the indirect blowing mode. When the user set temperature increases, the TAO value increases and changes from the fourth value range toward the fifth value range, and when the TAO value changes to the fifth value range, the air conditioning outlet is controlled to change from the indirect blowing mode to the centralized blowing mode.

Second Embodiment

A second embodiment of the present invention provides a method for controlling an air conditioning outlet of a vehicle, the method including: acquiring a temperature inside the vehicle, a temperature outside the vehicle, and a user set temperature (S1), calculating a TAO value according to the temperature inside the vehicle, the temperature outside the vehicle, and the user set temperature (S2), determining a target working mode from three working modes (centralized blowing mode, indirect blowing mode, and left-right sweeping mode) of an air conditioning outlet according to the TAO value (S3), and enabling the air conditioning outlet to work in the target working mode (S4).

A relation between the TAO value and the working mode of the air conditioning outlet is shown in Table 3.

TABLE 3

| | Cooling state | | | Heating state | |
|---|---|---|---|---|---|
| | First value range −10 or less | Second value range −10 to 10 | Third value range 10 to 20 | Fourth value range 20 to 55 | Fifth value range 55 or more |
| Working mode Air outlet direction | Centralized blowing mode Blow air to face | Left-right sweeping mode Intermittently blow air to face | Indirect blowing mode Blow air upward (blow air toward top of head) | Indirect blowing mode downward (blow Blow air air toward foot) | Centralized blowing mode DR: blow air to hand AS: blow air to body |

As shown in FIG. 3 and Table 3, in the cooling state, when the calculated TAO value is within the first value range, the air conditioning outlet is controlled to be in the centralized blowing mode. When the calculated TAO value is within the second value range, the air conditioning outlet is controlled to be in the left-right sweeping mode, and when the calculated TAO value is within the third value range, the air conditioning outlet is controlled to be in the indirect blowing mode. When the ambient temperature increases, the TAO value decreases, for example, may change from the second value range toward the first value range, and when the TAO value changes to the first value range, the air conditioning outlet is controlled to change from the left-right sweeping mode to the centralized blowing mode. When the user set temperature increases, the TAO value increases, for example, may change from the first value range toward the second value range, and when the TAO value changes to the second value range, the air conditioning outlet is controlled to change from the centralized blowing mode to the left-right sweeping mode.

In the heating state, when the calculated TAO value is within the fourth value range, the air conditioning outlet is controlled to be in the indirect blowing mode. When the calculated TAO value is within the fifth value range, the air conditioning outlet is controlled to be in the centralized blowing mode. When the ambient temperature increases, the TAO value decreases and changes from the fifth value range toward the fourth value range, and when the TAO value changes to the fourth value range, the air conditioning outlet is controlled to change from the centralized blowing mode to the indirect blowing mode. When the user set temperature increases, the TAO value increases and changes from the fourth value range toward the fifth value range, and when the TAO value changes to the fifth value range, the air conditioning outlet is controlled to change from the indirect blowing mode to the centralized blowing mode.

Third Embodiment

The third embodiment of the present invention provides a method for controlling an air conditioning outlet of a vehicle, steps of the method are the same as those of the first embodiment or the second embodiment, control of a working mode of an air conditioning outlet in a cooling state is the same as that of the first embodiment or the second embodiment, except that in a heating state, when the calculated TAO value is within the fourth value range, the air conditioning outlet is controlled to be in the indirect blowing mode, and when the calculated TAO value is within the fifth value range, a temperature of a heat radiator of the vehicle also needs to be collected, when the temperature of the heat radiator is equal to or higher than a first threshold, the air conditioning outlet is controlled to be in the centralized blowing mode, and when the temperature of the heat radiator is lower than the first threshold, the air conditioning outlet is controlled to change from the centralized blowing mode to the indirect blowing mode, as shown in FIG. 4 and Table 4. Specifically, the fourth value range may be 5 to 45, the fifth value range may be 45 or more, and the first threshold may be 45° C. Similarly, the fourth value range may be 20 to 60, the fifth value range may be 60 or more, and the first threshold may be 50° C.

A relation between the TAO value and the working mode of the air conditioning outlet is shown in Table 4.

TABLE 4

| | | Heating state | | |
|---|---|---|---|---|
| | | | Fifth value range | |
| | Cooling state | Fourth value range | Temperature of heater water tank | Temperature of heater water tank |
| Working mode Air outlet direction | Similar to Table 1 or Table 2 | Indirect blowing mode Blow air downward | Centralized blowing mode DR: blow air to hand AS: blow air to body | Indirect blowing mode Blow air upward (blow air toward |

TABLE 4-continued

| | Heating state | | |
|---|---|---|---|
| | | Fifth value range | |
| Cooling state | Fourth value range | Temperature of heater water tank | Temperature of heater water tank |
| | (blow air toward foot) | | top of head |

An embodiment of the present invention further provides a device for controlling an air conditioning outlet of a vehicle, including:

- a temperature acquisition module configured to collect an ambient temperature and a user set temperature;
- a target value determining module configured to determine a target value according to the ambient temperature and the user set temperature;
- an air conditioning outlet working mode determining module configured to determine a target working mode from a plurality of preset working modes of the air conditioning outlet according to the target value, the working mode including a preset air outlet direction; and
- a working module configured to enable the air conditioning outlet to work in the target working mode.

The device for controlling an air conditioning outlet of a vehicle is configured to execute the method for controlling an air conditioning outlet of a vehicle described in the above embodiments, and specific control content thereof can be known from the descriptions in the above embodiments, which will not be described herein.

An embodiment of the present invention further provides a vehicle, and an air outlet direction of an air conditioning outlet is controlled using the above provided method for controlling an air conditioning outlet of a vehicle.

In some embodiments, a plurality of control modes are provided for the air conditioning outlet of the vehicle, the method for controlling an air conditioning outlet of a vehicle is executed in a specific control mode, and the specific control mode is turned on or off by an operation of a user.

In the embodiments, the plurality of control modes of the air conditioning outlet in the vehicle may include: an operation mode, a forced centralization mode, a forced indirect mode, an automatic mode (Auto mode), and a switching mode.

The operation mode refers to that the user can slide up, down, left, right within a specified area on a control mode operation interface of the air conditioning outlet to adjust an air direction. In this mode, the air conditioning outlet can be freely adjusted.

The forced centralization mode refers to a mode in which the air conditioning outlet is forced to execute centralized blowing in a fixed manner, and the user may click an icon ICON of the forced centralization mode on the control mode operation interface of an electric air outlet, thereby adjusting the air outlet direction of the air conditioning outlet to blow air in a centralized manner (blowing air toward the face of the user all the time, or blowing air toward the hand and the body of the user all the time, for example, air may be blown toward the hand of the user sitting on the driver seat, and air may be blown toward the body of the user sitting on the passenger seat). In this mode, a plurality of air conditioning outlets can be simultaneously controlled to execute centralized blowing without an operation on each air conditioning outlet, thereby shortening the operation time.

The forced indirect mode refers to a mode in which the air conditioning outlet is forced to execute indirect blowing in a fixed manner, and the user can click the icon ICON of the forced indirect mode on the control mode operation interface of the air conditioning outlet, thereby adjusting the air outlet direction of the air conditioning outlet to be indirect blowing, so that air is blown avoiding the face of the user, and may be blown upward and toward the top of the head of the user. Also, air may be blown downward and toward the foot of the user. In this mode, a plurality of air conditioning outlets can be simultaneously controlled to execute indirect blowing without an operation on each air conditioning outlet, thereby shortening the operation time.

The automatic mode refers to a working mode in which the control unit automatically adjusts the air conditioning outlet based on collected information. The automatic mode is started or closed by clicking an automatic mode icon ICON on the control mode operation interface of the air conditioning outlet. In the present invention, the specific control mode refers to an automatic mode, and in the control mode, the air outlet direction of the air conditioning outlet may be controlled by using the above provided method for controlling an air conditioning outlet of a vehicle, and for a specific implementation, reference may be made to the above detailed description of the method for controlling an air conditioning outlet of a vehicle.

The switching mode refers to a mode in which an icon ICON of a switch is clicked on the control mode operation interface of the air conditioning outlet, thereby achieving opening and closing of the air conditioning outlet.

An embodiment of the present invention further provides a computing device, including:

- a communication interface;
- at least one processor connected to the communication interface; and
- at least one memory connected to the processor and storing a program instruction, when being executed by the at least one processor, the program instruction causing the at least one processor to execute the above method for controlling an air conditioning outlet of a vehicle.

An embodiment of the present invention further provides a computer-readable storage medium storing a program instruction, when being executed by a computer, the program instruction causing the computer to execute the above method for controlling an air conditioning outlet of a vehicle.

It should be noted that the above are only preferred embodiments and technical principles applied of this application. Those having ordinary skills in the art will understand that the present invention is not limited to the specific embodiments described herein, and various obvious changes, readjustments and substitutions can be made by those having ordinary skills in the art without departing from the scope of the present invention. Therefore, although this application has been described in detail through the above embodiments, the present invention is not limited to the above embodiments, and other equivalent embodiments may also be included without departing from the concept of the present invention, all of which belong to the protection scope of the present invention.

What is claimed is:

1. A method for controlling an air conditioning outlet of a vehicle, comprising:

collecting an ambient temperature and a user set temperature;

determining a target value according to the ambient temperature and the user set temperature;

determining a target working mode from a plurality of preset working modes of the air conditioning outlet according to the target value, the target working mode including a preset air outlet direction; and enabling the air conditioning outlet to work in the target working mode, wherein the target working mode includes a first working mode and a second working mode, the first working mode including a preset first air outlet direction in which the air conditioning outlet faces a user, and the second working mode including a preset second air outlet direction in which the air conditioning outlet does not face the user, the target value includes a first value range and a second value range, and in a cooling state, in response to the target value being within the first value range, the air conditioning outlet is controlled to be in the first working mode, and in response to the target value being within the second value range, the air conditioning outlet is controlled to be in the second working mode, and the second value range is higher than the first value range.

2. The method for controlling the air conditioning outlet of a vehicle according to claim 1, wherein the target working mode further includes a third working mode, the third working mode including a preset third air outlet direction in which the air conditioning outlet intermittently faces the user.

3. The method for controlling the air conditioning outlet of a vehicle according to claim 2, wherein the first working mode is a centralized blowing mode, the second working mode is an indirect blowing mode, and the third working mode is a left-right sweeping mode.

4. The method for controlling the air conditioning outlet of a vehicle according to claim 1, wherein in response to the ambient temperature being determined to increase, the target value changes from the second value range toward the first value range;

alternatively, in response to the user set temperature being determined to increase, the target value changes from the first value range toward the second value range.

5. The method for controlling the air conditioning outlet of a vehicle according to claim 2, wherein the target value includes the first value range, the second value range, and a third value range, and in the cooling state, in response to the target value being determined to be within the first value range, the air conditioning outlet is controlled to be in the first working mode, in response to the target value being determined to be within the second value range, the air conditioning outlet is controlled to be in the third working mode, and in response to the target value being determined to be within the third value range, the air conditioning outlet is controlled to be in the second working mode, the third value range is higher than the second value range, and the second value range is higher than the first value range.

6. The method for controlling the air conditioning outlet of a vehicle according to claim 5, wherein in response to the ambient temperature being determined to increase, the target value changes from the second value range toward the first value range, or the target value changes from the third value range toward the second value range, or the target value changes from the third value range toward the first value range;

alternatively, in response to the user set temperature being determined to increase, the target value changes from the first value range toward the second value range, or the target value changes from the second value range toward the third value range, or the target value changes from the first value range toward the third value range.

7. The method for controlling the air conditioning outlet of a vehicle according to claim 1, wherein the target value includes a fourth value range and a fifth value range, and in a heating state, in response to the target value being determined to be within the fourth value range, the air conditioning outlet is controlled to be in the second working mode, in response to the target value being determined to be within the fifth value range, the air conditioning outlet is controlled to be in the first working mode, and the fifth value range is higher than the fourth value range.

8. The method for controlling the air conditioning outlet of a vehicle according to claim 7, wherein in response to the ambient temperature being determined to increase, the target value changes from the fifth value range toward the fourth value range;

alternatively, in response to the user set temperature being determined to increase increases, the target value changes from the fourth value range toward the fifth value range.

9. The method for controlling the air conditioning outlet of a vehicle according to claim 1, wherein the target value includes a fourth value range and a fifth value range, and in a heating state, in response to the target value being determined to be within the fourth value range, the air conditioning outlet is controlled to be in the second working mode, and in response to the target value being determined to be within the fifth value range, a temperature of a heat radiator of the vehicle is collected, and in response to the temperature of the heat radiator being determined to be equal to or higher than a first threshold, the air conditioning outlet is controlled to be in the first working mode, in response to the temperature of the heat radiator being determined to be lower than the first threshold, the air conditioning outlet is controlled to be in the second working mode, and the fifth value range is higher than the fourth value range.

10. The method for controlling the air conditioning outlet of a vehicle according to claim 9, wherein in response to the ambient temperature being determined to increase, the target value changes from the fifth value range toward the fourth value range;

alternatively, in response to the user set temperature being determined to increase, the target value changes from the fourth value range toward the fifth value range.

11. The method for controlling the air conditioning outlet of a vehicle according to claim 1, wherein the ambient temperature includes a temperature inside the vehicle and a temperature outside the vehicle.

12. The method for controlling the air conditioning outlet of a vehicle according to claim 2, further comprising: collecting a specific coordinate point set by the user, and controlling the air conditioning outlet to blow air toward the specific coordinate point, wherein the specific coordinate point is selected from a plurality of equally divided coordinate points set in a transverse space and a vertical space on a rear side of the vehicle that the air conditioning outlet faces.

13. The method for controlling the air conditioning outlet of a vehicle according to claim 12, wherein the specific coordinate point includes a first coordinate point, a second coordinate point, a third coordinate point, and a fourth coordinate point, and controlling the air conditioning outlet to blow air toward the specific coordinate point includes:

controlling the air conditioning outlet to sweep air back and forth between the first coordinate point and the second coordinate point in response to the target working mode of the air conditioning outlet being the third working mode;

controlling the air conditioning outlet to blow air toward the third coordinate point in response to the target working mode of the air conditioning outlet being the first working mode; and controlling the air conditioning outlet to blow air toward the fourth coordinate point in response to the target working mode of the air conditioning outlet being the second working mode, the plurality of equally divided coordinate points set in the transverse space and the vertical space include a coordinate point of a first range, a coordinate point of a second range, and a coordinate point of a third range, the third range being higher than the second range, the second range being higher than the first range, the third coordinate point being selected within the coordinate point of the second range, and the fourth coordinate point being selected within the coordinate point of the first range or the coordinate point of the third range.

14. The method for controlling the air conditioning outlet of a vehicle according to claim 13, further comprising:

recording a specific coordinate point set by the user and the target working mode of the air conditioning outlet; and controlling, in response to the user being detected, the air conditioning outlet to blow air toward the specific coordinate point in the target working mode according to the recorded specific coordinate point and target working mode.

15. A vehicle, wherein an air outlet direction of an air conditioning outlet is controlled using the method for controlling an air conditioning outlet of a vehicle according to claim 1.

16. The vehicle according to claim 15, wherein a plurality of control modes are provided for the air conditioning outlet of the vehicle, the method for controlling an air conditioning outlet of a vehicle is executed in a specific control mode, and the specific control mode is turned on or off by an operation of a user.

17. A computing device comprising:

a communication interface;

at least one processor connected to the communication interface; and at least one memory connected to the at least one processor and storing a program instruction, when being executed by the at least one processor, the program instruction causing the at least one processor to execute the method for controlling an air conditioning outlet of a vehicle according to claim 1.

18. A computer-readable storage medium storing a program instruction, when being executed by a computer, the program instruction causing the computer to execute the method for controlling an air conditioning outlet of a vehicle according to claim 1.

19. A device for controlling an air conditioning outlet of a vehicle, comprising:

a temperature measuring device configured to collect an ambient temperature and a user set temperature;

an electronic control unit configured to operate as:

a target value determining module configured to determine a target value according to the ambient temperature and the user set temperature;

an air conditioning outlet working mode determining module configured to determine a target working mode from a plurality of preset working modes of the air conditioning outlet according to the target value, the target working mode including a preset air outlet direction; and a working module configured to enable the air conditioning outlet to work in the target working mode, wherein the target working mode includes a first working mode and a second working mode, the first working mode including a preset first air outlet direction in which the air conditioning outlet faces a user, and the second working mode including a preset second air outlet direction in which the air conditioning outlet does not face the user, the target value includes a first value range and a second value range, and in a cooling state, in response to the target value being within the first value range, the air conditioning outlet is controlled to be in the first working mode, in response to the target value being within the second value range, the air conditioning outlet is controlled to be in the second working mode, and the second value range is higher than the first value range.

* * * * *